US012381846B2

(12) United States Patent
Narayanan et al.

(10) Patent No.: US 12,381,846 B2
(45) Date of Patent: Aug. 5, 2025

(54) TRANSCEIVER VALIDATION PORTS FOR NETWORK SWITCHES

(71) Applicant: DELL PRODUCTS L.P., Round Rock, TX (US)

(72) Inventors: Padmanabhan Narayanan, Redmond, WA (US); Ming Chung Chow, Pleasanton, CA (US); Vamshidhar Varre, Telengana (IN); Kannan Karuppiah, Fremont, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 922 days.

(21) Appl. No.: 17/494,342

(22) Filed: Oct. 5, 2021

(65) Prior Publication Data

US 2023/0105893 A1 Apr. 6, 2023

(51) Int. Cl.
*H04L 29/06* (2006.01)
*G06F 11/22* (2006.01)
*H04L 9/40* (2022.01)
*H04L 41/0873* (2022.01)

(52) U.S. Cl.
CPC .......... *H04L 63/0236* (2013.01); *G06F 11/22* (2013.01); *H04L 41/0873* (2013.01); *H04L 63/08* (2013.01)

(58) Field of Classification Search
CPC . H04L 63/0236; H04L 41/0873; H04L 63/08; G06F 11/22

USPC ......................................................... 370/241
See application file for complete search history.

(56) References Cited

U.S. PATENT DOCUMENTS 10,796,035 B1* 10/2020 Xia .......................... G06F 30/18
2019/0384740 A1* 12/2019 Huang ................ G06F 13/4022
2022/0066895 A1*  3/2022 Itkin ..................... G06F 21/606

OTHER PUBLICATIONS

"Dell Networking Transceivers and Cables," Dell Technologies, Networking Optics Spec Sheet, Version 2.0, [online], [Retrieved Aug. 31, 2023]. Retrieved from Internet <URL: https://www.delltechnologies.com/asset/en-us/products/networking/technical-support/Dell_EMC_Networking_Optics_Spec_Sheet.pdf> (10pgs).
Jim Greene, "Implementing an 12C® Reset," AN-686 Application Note, 2003. (2pgs).

* cited by examiner

*Primary Examiner* — Christopher M Crutchfield
*Assistant Examiner* — Jean F Voltaire
(74) *Attorney, Agent, or Firm* — BAUGH LAW, LLC

(57) ABSTRACT

Systems and methods for validating transceivers comprise using a first controller to perform a validation prior to granting a second controller access to the transceiver to communicate in a data plane and, otherwise, restricting the second controller from accessing the transceiver and operating in the data plane to isolate the transceiver from the data plane and protect the second controller from an unqualified or rogue transceiver triggering a recovery procedure, reboot procedure, or similar that otherwise would require manual intervention by technical support personnel and increase equipment downtime and cost.

20 Claims, 9 Drawing Sheets

TRANSCEIVER VALIDATION PORTS FOR NETWORK SWITCHES

BACKGROUND

A. Technical Field

The present disclosure relates generally to information handling systems. More particularly, the present disclosure related to systems and methods for configuring network switch ports, such as transceiver ports.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern network switches support ports that operate across a wide range of Ethernet transmission speeds up to 400 Gb/s, which enables a wide range of connectivity options for datacenters and related applications. "Super spines" will soon use ports that support 800 Gb/s and higher Ethernet speeds. In most deployments, capital expenditure on transceivers per switch is many times higher than the cost of the network switch itself.

Installing, initializing, upgrading, and maintaining transceivers and cabling are fundamental challenges in operating datacenters as errors and incompatibility issues have a direct impact on equipment downtime and customer experience. Despite the availability of extensive documentation, message logs, alerts, and software workarounds, nothing prevents a user from inadvertently connecting a transceiver that is not supported by or incompatible with a particular network switch to a switch port, or from connecting a transceiver that is compatible but suffers from some type of malfunction caused by equipment degradation or some other reason. Such errors cause other transceiver modules in the system from becoming undetectable when plugged into the network switch, thus, requiring manual removal of the offending transceiver and a recovery procedure or, if unsuccessful, a software reboot of the entire network switch. Disadvantageously, manual intervention increases technical assistance center or support costs in both production and pre-production environments.

Although the root cause of most issues, barring few exceptions, typically lies with the transceiver, the onus is on the network switch manufacturer to troubleshoot the issue and to provide workarounds and solutions that require the involvement of technical assistance center personnel and, sometimes, an entire engineering team that provides support and perform elaborate and costly root cause analysis. In addition, in many cases, a fault isolation or software recovery procedure cannot be performed without disturbing the control plane despite considerable efforts in isolating the transceiver, multiplexer, Inter-Integrated Circuit (I2C) line, and controller faults, both from a hardware and software standpoint. Moreover, an ever-increasing list of networking switch platforms, network operating systems (NOSs), optics, standards, e.g., Common Management Interface Specification (CMIS) 4 or Management Interface for 4-lane Modules and Cables specification (SFF-8636) and the lack of media debug tools makes qualification and support a challenge.

Accordingly, what is needed are efficient qualification systems and methods that ensure that transceiver modules and network switches are compatible with each other at installation and maintenance to eliminate equipment downtime due to incompatible or degraded transceivers, thereby, improving customer experience.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
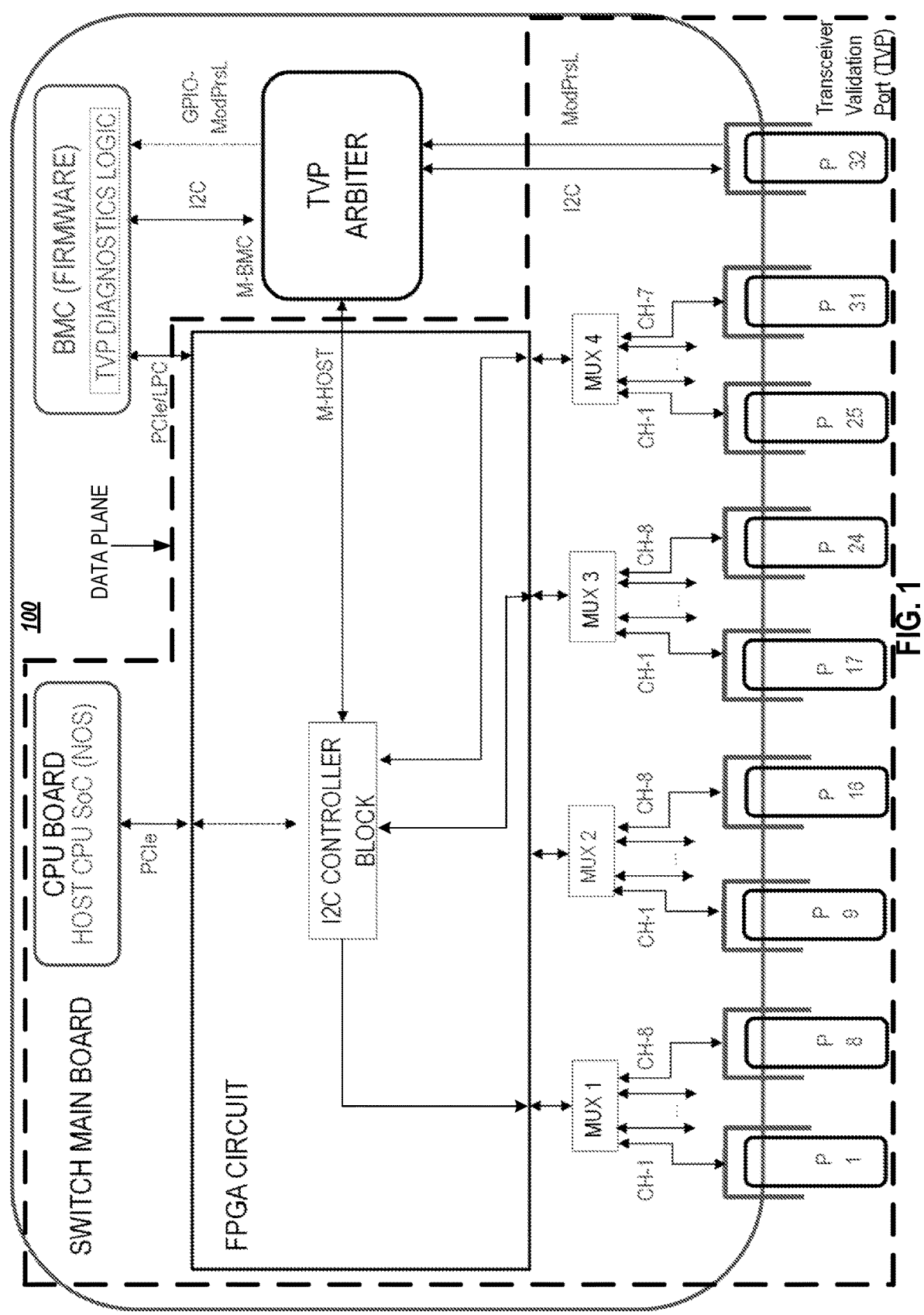
FIG. 1 depicts an exemplary network switch comprising a transceiver validation port, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "I2C channel" and "TVP I2C channel" may be used interchangeably. Similarly, "transceiver" and "transceiver module" are used interchangeably. "Test port" refers both single-use and dual-use "TVPs." The term "unqualified" refers to an incompatible or faulty transceiver that has not successfully passed a qualification or validation procedure. The term "primary" indicates ownership by a controlling or master unit.

FIG. 1 depicts an exemplary network switch comprising a TVP, according to embodiments of the present disclosure. Network switch 100 comprises a host NOS, e.g., SONiC or OS10, that may operate on a CPU board's host's CPU system on a chip (SoC), a Baseboard Management Controller (BMC), a field-programmable gate array (FPGA) circuit that may comprise an I2C controller block, a TVP arbiter, and a TVP (denoted as P32 in FIG. 1). In operation, BMC may perform known control functions, such as power supply and thermal control functions. In addition, in one or more embodiments, BMC may operate as part of the BMC firmware or a TVP diagnostics logic, which may be implemented as a hardware and/or software control logic.

In one or more embodiments, TVP arbiter may be implemented as a TVP I2C 2-1 arbiter and facilitate a dedicated path between the BMC and the test port to control the test port and perform validation operations, e.g., prior to handing over control to the CPU. In one or more embodiments, the dedicated path may comprise the BMC, TVP arbiter, and TVP and operate in a dedicated control plane. In one or more embodiments, the TVP arbiter may comprise two primary ports, a P-BMC port (or interface) that may be accessed from the BMC, and a P-host port that may be accessed from the host NOS. The TVP I2C arbiter may further comprise a downstream leaf port that is connected to the TVP that may be a designated port located on the front panel of network switch 100 (e.g., the highest numbered port) and may have an identifying mark, e.g., be uniquely colored. In one or more embodiments, the TVP I2C arbiter may be coupled to the test port via an I2C bus, which may operate at a different speed than other communication lines in network switch 100.

As depicted in the example in FIG. 1, network switch 100 comprises 32 front-end switch ports (labeled P1 through P32) that each may be coupled to a receptacle or "cage" designed to accept a complimentary connector, e.g., a Small Form-Factor Pluggable (SFP) or Quad Small Form-Factor Pluggable (QSFP) connector that facilitates a mechanical and electrical (or electro-optical) connection between network switch 100 and a transceiver (not shown). In one or more embodiments, the NOS may access transceivers via the I2C controller block, which may be integrated into the FPGA circuit that can be accessed via a Peripheral Component Interconnect Express (PCIe) interface.

Transceivers that are plugged into switch ports may be viewed as leaves of a multiplexer (MUX) tree in which several transceivers share a common MUX path to the root of the I2C tree. In FIG. 1, four exemplary port multiplexers (denoted as MUX 1 through MUX 4) are coupled to the FPGA circuit. MUX 1 through MUX 3 each are coupled to eight front panel ports associated with respective channels CH-1 through CH-8, and MUX 4 are coupled to seven ports (P25 through P31), i.e., port P32 is not accessible through the MUX tree.

It is noted that network switch 100 in FIG. 1 is not limited to the constructional detail shown there or described in the accompanying text. As those skilled in the art will appreciate, a suitable network switch may comprise a data plane (indicated by dashed lines in FIG. 1) comprising a serializer/deserializer path and any number of control elements known in the art, such as converters, amplifiers, and memory devices. Without loss of generality, the I2C controller block and/or the MUX tree need not be part of the FPGA circuit.

The FPGA circuit, apart from hosting the I2C controller block may provide a variety of functions, such as providing access to "port status and control" for querying a Module Present (ModPrsL) control signal that is communicated to the BMC once the presence of a transceiver in a TVP cage is detected, setting low power (LP) mode, and exchanging other control signals or commands. In one or more embodiments, the BMC, or any other platform management controller running BMC firmware, may be coupled to the FPGA circuit using a PCIe or Low Pin Count bus standard. A person of skill in the art will appreciate that other interfaces may be used to facilitate communication between components internal and/or external to network switch 100. For example, the BMC may have an interface to communicate with the CPU board. Similarly, the BMC may have an I2C interface to the FPGA circuit, e.g., to access the I2C controller block, even if in some embodiments such a connection is not used when the application operating on the host CPU, i.e., the NOS, is tasked with configuring, monitoring, and/or controlling ports.

Various embodiments herein utilize systems that integrate transceiver validation capabilities such that, once an operator plugs in a transceiver into a dedicated test port, network switch 100 facilitates communication, e.g., over an I2C channel, between the test port and the BMC, which may retain control over newly inserted transceivers, e.g., after each online insertion and removal (OIR) event. In one or more embodiments, the BMC may use one or more diagnostic tools to validate the transceiver's compatibility with the platform, e.g., before publishing the transceiver's presence to the NOS and permitting the NOS to access the transceiver via the TVP I2C arbiter or over the MUX tree if the same transceiver is unplugged from the TVP port and plugged into one of the non-TVP ports.

Advantageously, by isolating the transceiver from the data plane, inter-port interference and interruptions to the data plane of the CPU board may be successfully reduced or avoided. In one or more embodiments, the serial clock line and serial data line of the I2C communications channel may be accessed and controlled via the TVP I2C arbiter, while the NOS may be inhibited from accessing the TVP via the MUX tree. From the BMC's perspective, for testing and qualifying purposes, the transceiver is thus isolated to its own dedicated bus instead of sharing a bus with the NOS or the host CPU.

In contrast, in existing network switches that use I2C MUX-based transceiver access, the host NOS detects a transceiver plug-in event at a common switch port, typically through an FPGA register polling/interrupt mechanism by using a ModPrsL signal. The host NOS attempts to access and retrieve configuration information from the transceiver's electrically erasable programmable read-only memory (EEPROM) over the MUX tree by using an I2C controller implemented in the host CPU or an FPGA. As a result, when an incompatible or faulty transceiver is plugged into the port, the NOS's optics driver enters an irrecoverable state that necessitates expensive and disruptive software workarounds, including procedures such as bit-bang I2C recovery and partial or full re-initialization of the NOS / host CPU (FPGA/I2C) drivers, and isolation of the I2C MUX line connected to the transceiver deemed incompatible or faulty.

In one or more embodiments, upon a system reset or after an OIR event of a transceiver at the TVP, e.g., when the ModPrsL signal status changes, the TVP I2C arbiter may cause the P-BMC port of the arbiter to become the primary port such that the BMC may use the TVP diagnostics logic to gain ownership or control over the I2C channel to the TVP. In this way, each time when another transceiver is inserted for validation, ownership may revert to the P-BMC port. As depicted in FIG. 1, the ModPrsL signal may be routed to the BMC, e.g., using a general-purpose input/output (GPIO) interrupt (denoted as GPIO-ModPrsL) that may notify the TVP diagnostics logic software thread in the BMC firmware of the transceiver. In one or more embodiments, the BMC firmware may switch ownership by assigning it to the P-host port, e.g., via a control signal communicated to the TVP I2C arbiter. And the ModPrsL signal for the TVP in a port status and control block of the FPGA may be updated only when the P-host port is the primary port.

In one or more embodiments, once an operator inserts a transceiver into the TVP, TVP I2C arbiter priority settings may assign ownership over the I2C channel to the P-BMC port, and the GPIO-ModPrsL signal may notify the TVP diagnostics logic of the transceiver insertion event. Having gained ownership or control over the I2C channel to the TVP, the BMC may start a diagnostic test procedure to validate the transceiver connected to the TVP. The BMC may use the TVP diagnostics logic to record the transceiver's ID (e.g., vendor ID) and serial number and the results of any number of diagnostic tests such that the NOS can determine if a transceiver has been validated, e.g., by reading records via a CPU board-BMC interface (not shown).

In one or more embodiments, validation may comprise accessing the transceiver's EEPROM's pages and performing a number of tests, such as validating the pages' contents; read/write tests, low speed signal pins check, link up, and loopback tests; digital optical monitoring checks or flags in the case of optical transceivers; verifying access to the transceiver's internal PHYs (e.g., for Ethernet over twisted pair) or integrated circuits; and verifying EEPROM accessibility at various clock speeds from sub-100 kHz to 400 kHz or higher.

In one or more embodiments, upon successful validation of the transceiver, the TVP diagnostics logic may change or override the ownership of the TVP I2C channel by making the P-host port the primary port, and the TVP I2C arbiter may update the ModPrsL status in the port status and control block such that the NOS may now become aware of the transceiver's presence and access the test port via the TVP I2C arbiter.

In one or more embodiments, once a user removes and reinserts the same transceiver into a different port (i.e., one of empty Ports 1-31) for regular deployment and operation, the NOS may operate with the validated transceiver as intended and proceed to bring up and initialize and configure it. At the same time, ownership may be returned to the P-BMC port. In one or more embodiments, upon a failed transceiver validation, e.g., in response to the TVP diagnostics logic detecting a fault or transceiver incompatibility, a notification may be sent to the operator, e.g., by using a light emitting diode (LED), BMC logs, or similar, and ownership may remain with the P-BMC port, thus, preventing interference with NOS functions and preventing the CPU board from triggering a recovery or reboot procedure despite a failed validation.

Advantageously, this reduces equipment downtime otherwise caused by unqualified or degraded optics and makes it possible to debug media-related issues in production from the convenience of the BMC without having to engage a diagnostics operating system or relying on NOS capabilities. As a result, undesirable delays in port configuration, including technical support costs and disruptions that can affect overall system operation, may be drastically reduced or eliminated altogether.

Figure 2:
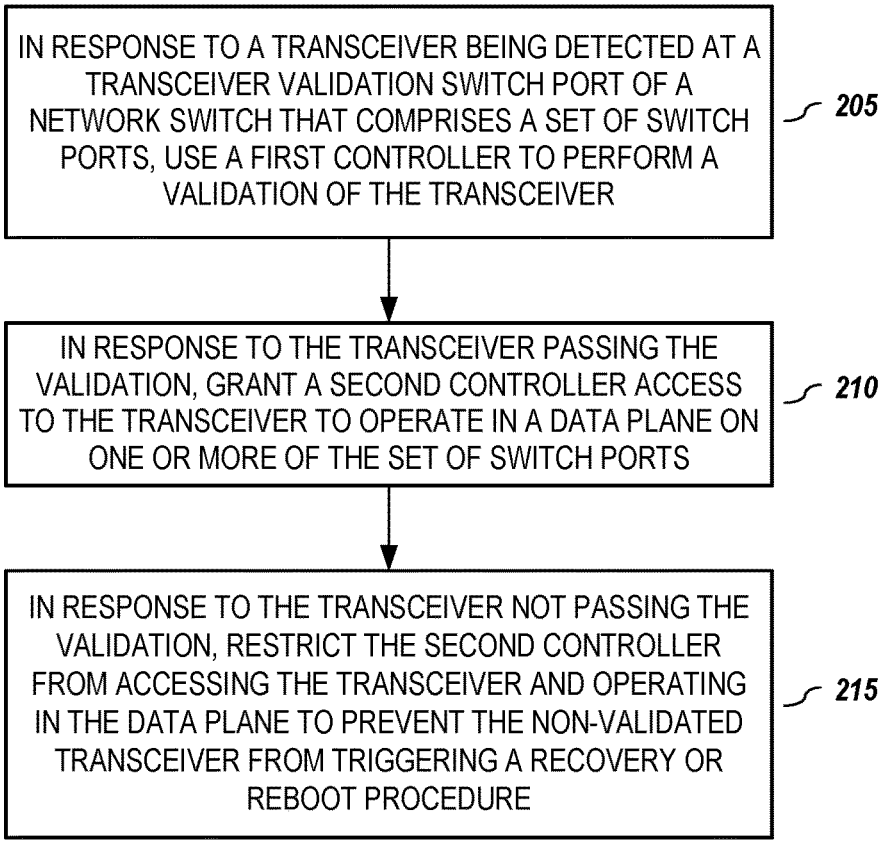
FIG. 2 depicts a flowchart of an exemplary process for validating a transceiver, according to embodiments of the present disclosure.

FIG. 2 depicts a flowchart of an exemplary process for validating a transceiver, according to embodiments of the present disclosure. In one or more embodiments, process 200 may begin when, in response to a transceiver being detected at a test port of a network switch comprising a set of switch ports, a first controller is used to perform a validation (205) of the transceiver. In response to the transceiver passing validation, a second controller may be granted access (210) to the transceiver to operate in a data plane on one or more of the set of switch ports. Conversely, in response to the transceiver not passing, the second controller may be restricted (215) from accessing the transceiver and operating in the data plane, thereby isolating the second controller from the effects of a non-validated transceiver triggering at least one of a recovery procedure or a reboot procedure.

FIG. 2 depicts a flowchart of an exemplary process for validating a transceiver, according to embodiments of the present disclosure. In one or more embodiments, process 200 may begin when, in response to a transceiver being detected at a test port of a network switch comprising a set of switch ports, a first controller is used to perform a validation (205) of the transceiver. In response to the transceiver passing validation, a second controller may be granted access (210) to the transceiver to operate in a data plane on one or more of the set of switch ports. Conversely, in response to the transceiver not passing, the second controller may be restricted (215) from accessing the transceiver and operating in the data plane, thereby, isolating the second controller from the effects of a non-validated transceiver triggering at least one of a recovery procedure or a reboot procedure.

It shall be noted that herein: (1) certain steps may optionally be performed; (2) steps may not be limited to the specific order set forth herein; (3) certain steps may be performed in different orders; and (4) certain steps may be done concurrently.

Figure 3:
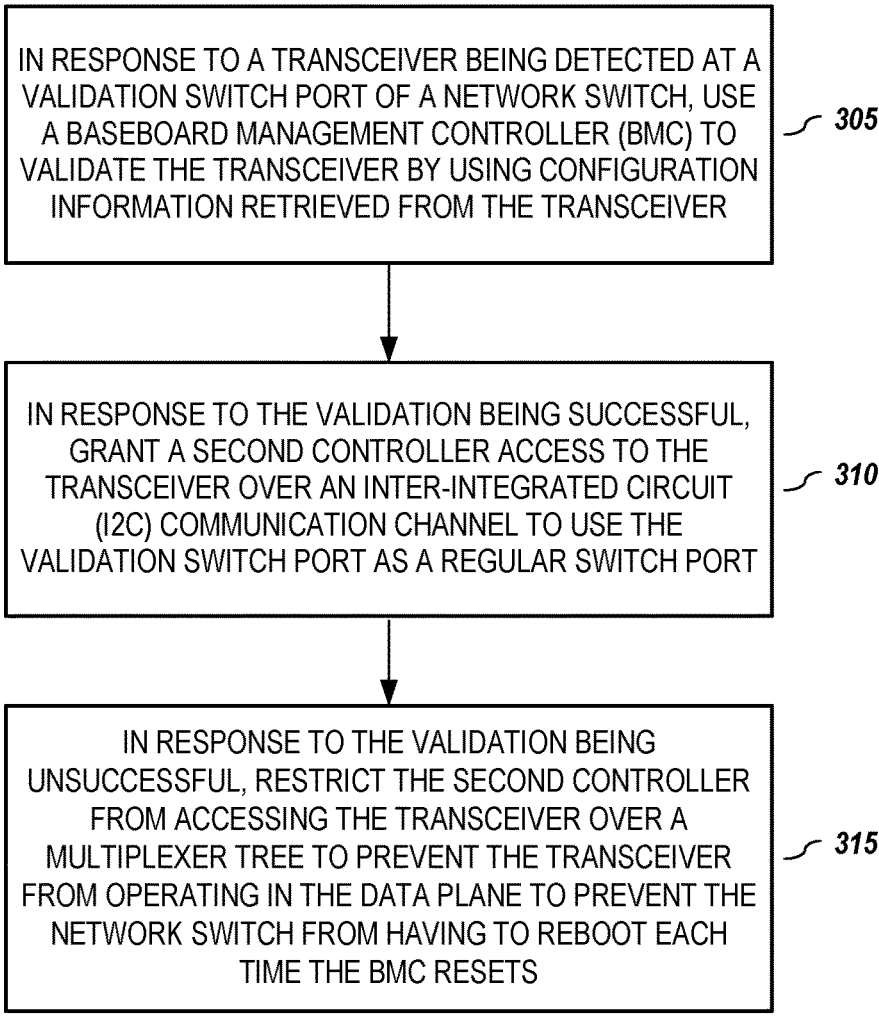
FIG. 3 depicts a flowchart of an exemplary process for a dual use test validation port (TVP) that can validate a transceiver, according to embodiments of the present disclosure.

FIG. 3 depicts a flowchart of an exemplary process for a dual use TVP that can validate a transceiver, according to embodiments of the present disclosure. In one or more embodiments, process 300 may begin when in response to a transceiver being detected at a validation switch port of a network switch, a BMC is used to validate (305) the transceiver, e.g., by using configuration information that has been retrieved from the transceiver by a logic circuit. In one or more embodiments, validation may comprise testing a compatibility of the transceiver with the network switch and/or testing one or more transceiver functions.

In one or more embodiments, in response to the validation being successful, a second controller, e.g., a CPU board, may be granted access (310) to the transceiver via an I2C communication channel to use the validation switch port as a regular switch port. In response to the validation being unsuccessful, the second controller may be restricted (315) from accessing the transceiver, e.g., via a MUX tree, such as to prevent the transceiver from operating in the data plane, thereby, preventing the CPU board from having to reboot each time the BMC resets in response to determining that a transceiver is not compatible with the network switch.

In one or more embodiments, a successful validation may be visually displayed, e.g., by an LED located at or near the test port, which itself may comprise a visual indicator that identifies the test port as a designated TVP capable of validating hardware modules. Once a transceiver has been validated a user may connect the validated transceiver into any available port on the switch, e.g., until all non-TVP ports are occupied. In one or more dual-use embodiments, once the final transceiver completes a validation routine, the TVP may be used to access and configure that transceiver during a regular mode of operation, i.e., by using the test port as a regular switch port, for example in response to the first controller shifting ownership over the I2C communication channel to the second controller, as discussed above with reference to FIG. 1.

Figure 4:
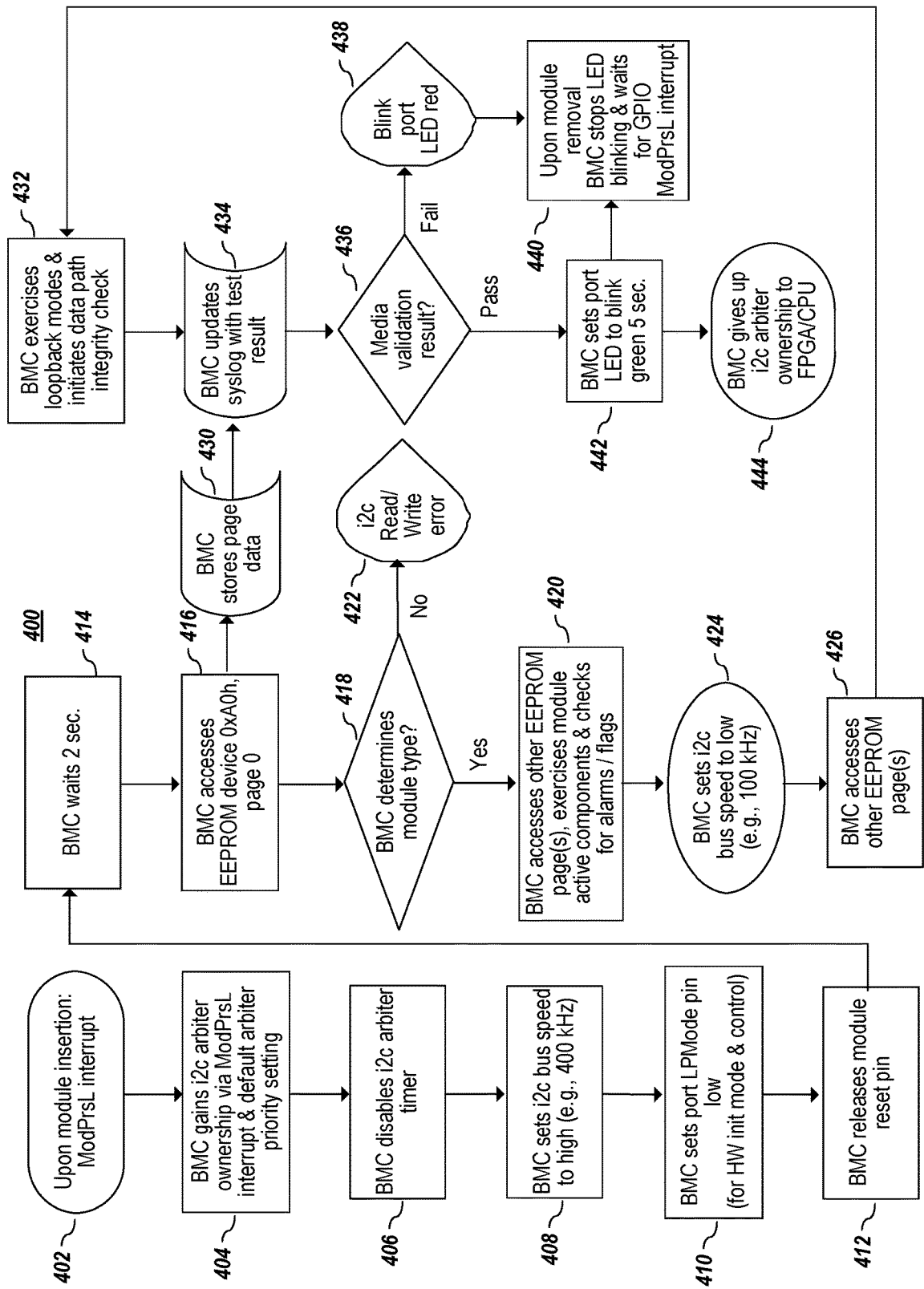
FIG. 4 depicts a simplified flowchart illustrating a process for validating a transceiver at a TVP of a network switch, according to embodiments of the present disclosure.

FIG. 4 depicts a simplified flowchart illustrating a process for validating a transceiver at a TVP of a network switch, according to embodiments of the present disclosure. In one or more embodiments, exemplary transceiver validation process 400 may be implemented, e.g., in a BMC diagnostic firmware design. As previously mentioned, an unqualified or rogue transceiver (e.g., one that cannot be qualified due to a mismatch with the I2C controller block's clocking frequency or one having impaired components) can lock out an I2C controller, a subset of ports associated with an I2C MUX, or the entire control plane and require undesirable system re-initialization that may affect otherwise fully operational transceivers.

In one or more embodiments, process 400 may begin when a user inserts (402) a transceiver into a TVP that may trigger a status change on a ModPrsL pin that allows the BMC to gain ownership (404), e.g., via a TVP arbiter, such as that shown in FIG. 1, which may, by default, grant ownership to the BMC. The BMC may disable (406) a timer in the TVP arbiter to ensure that the CPU does not inadvertently take ownership of the I2C channel. In this manner, the BMC may establish an isolated path that connects to the TVP via the I2C bus, e.g., a bus that is set (408) to a nominal clock speed, here, 400 kHz.

In one or more embodiments, e.g., in preparation of testing various transceiver's functions, the BMC may set (410) the port's low power mode (LPmode) pin to low. The BMC may further release (412) the module reset pin, and wait (414) for a certain period of time before accessing (416) the transceivers EEPROM device to retrieve data, e.g., from a default page that identifies a module type by clock speed. The BMC may save or cache (430) the retrieved data, e.g., in internal memory, and update (434) a system log, e.g., for subsequent use by the CPU.

In one or more embodiments, if the BMC fails to determine (418) the type of the transceiver that has been inserted into the TVP, e.g., due to I2C failure that prevents access to the EEPROM, a read/write error may be triggered (422). Otherwise, depending on module type, the BMC may access (420) additional pages stored on the EEPROM, e.g., to access various components within the transceiver, such as physical interface (PHY) registers.

In one or more embodiments, the BMC may set (424) the I2C bus speed to a second nominal speed, e.g., 100 kHz and access (426) other EEPROM pages to exercise and loopback modes and initiate a data path integrity check, e.g., to test for signal integrity between a host and a transceiver as part of the validation test. The results may be logged (434) and, if the transceiver fails validation or qualification, an LED may indicate (438) a corresponding result. Once the defective module is removed, the BMC may await (440) an interrupt based on a GPIO ModPrsL control signal. Conversely, if the transceiver passes the test, the BMC may cause the port to indicate (442) the result, e.g., by activating the LED before turning ownership over (444) to, e.g., an FPGA or the CPU.

Figure 5A:
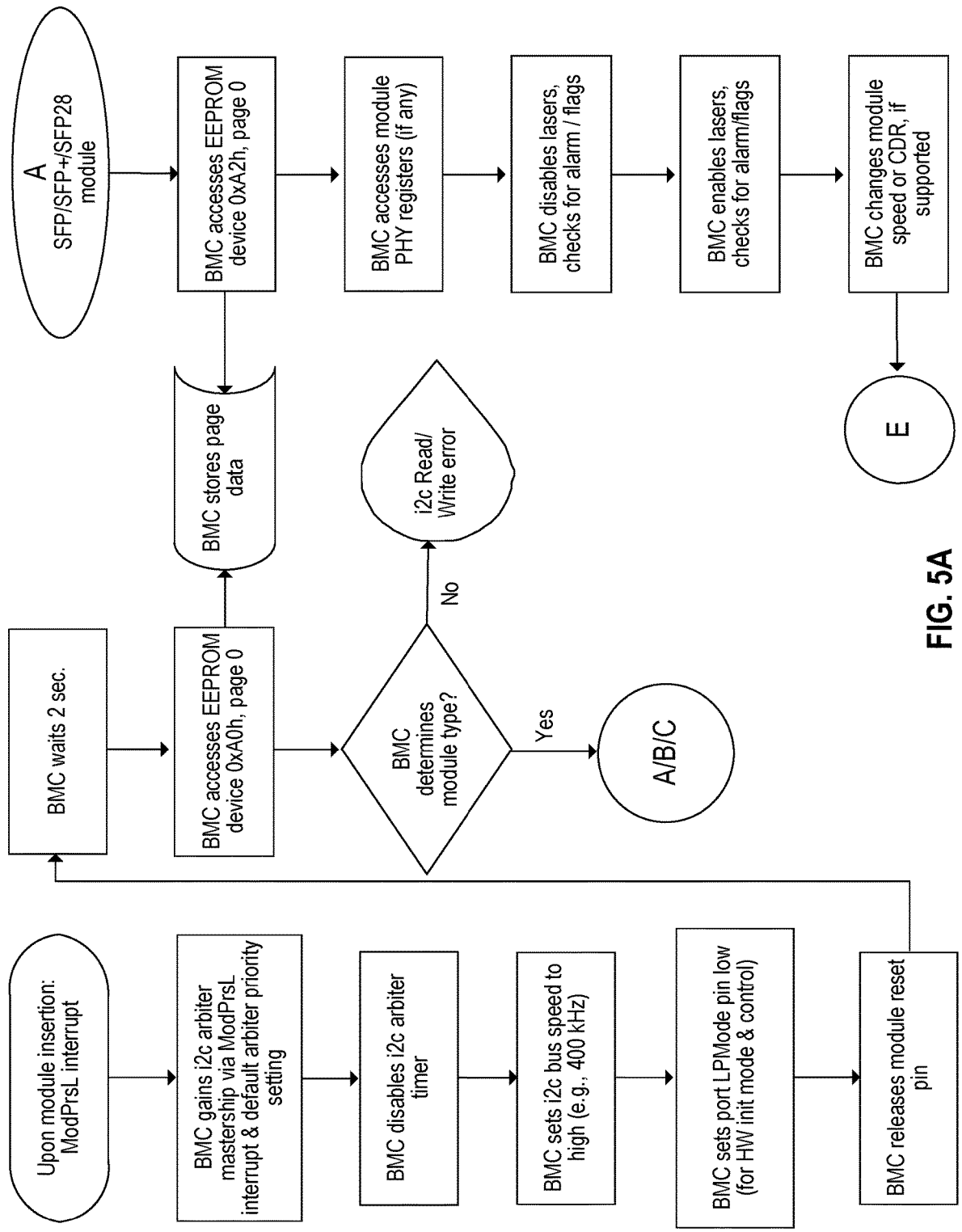
FIG. 5A-FIG. 5C depict a different process for validating transceivers, according to embodiments of the present disclosure.
Figure 5B:
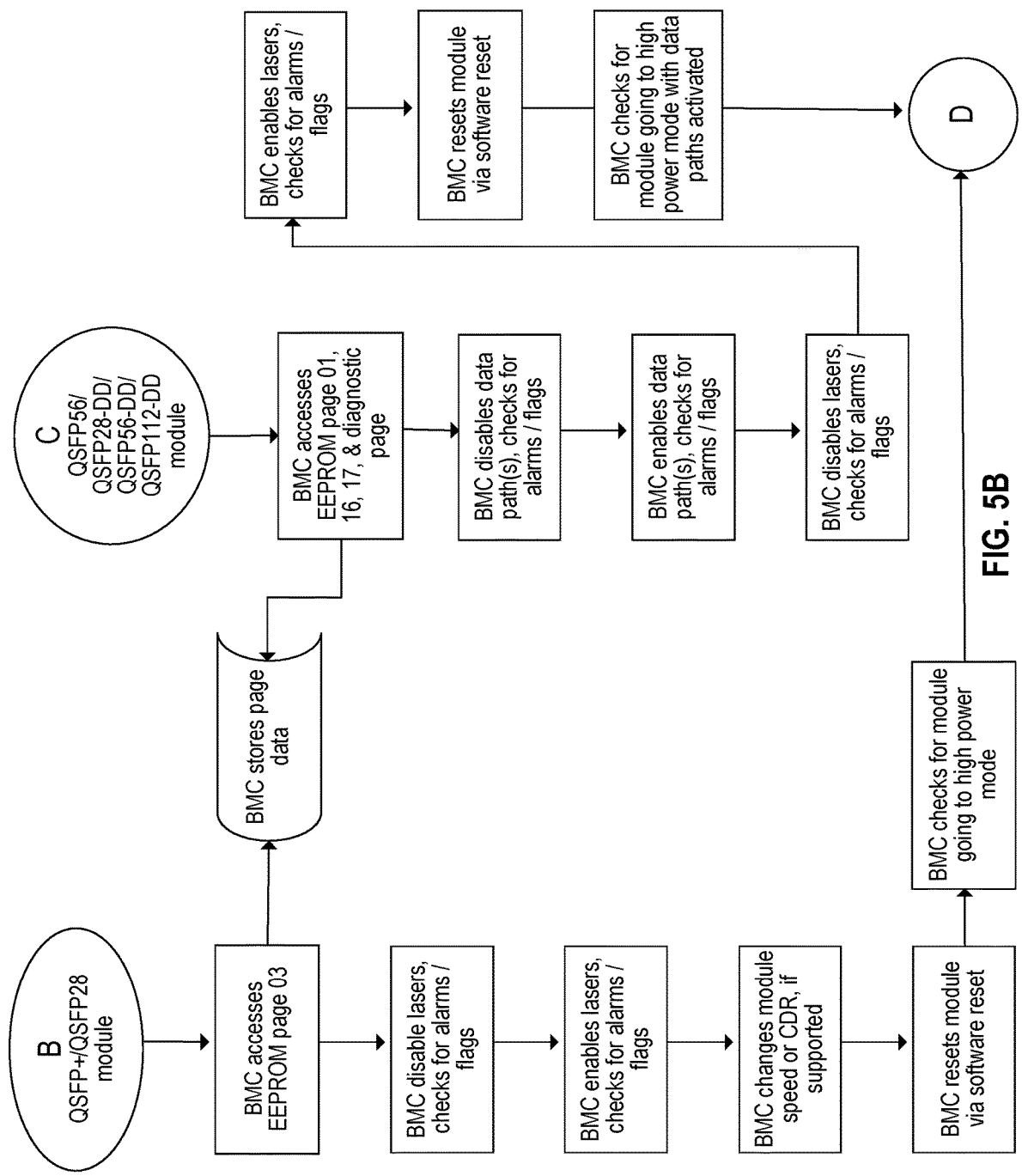
Figure 5C:
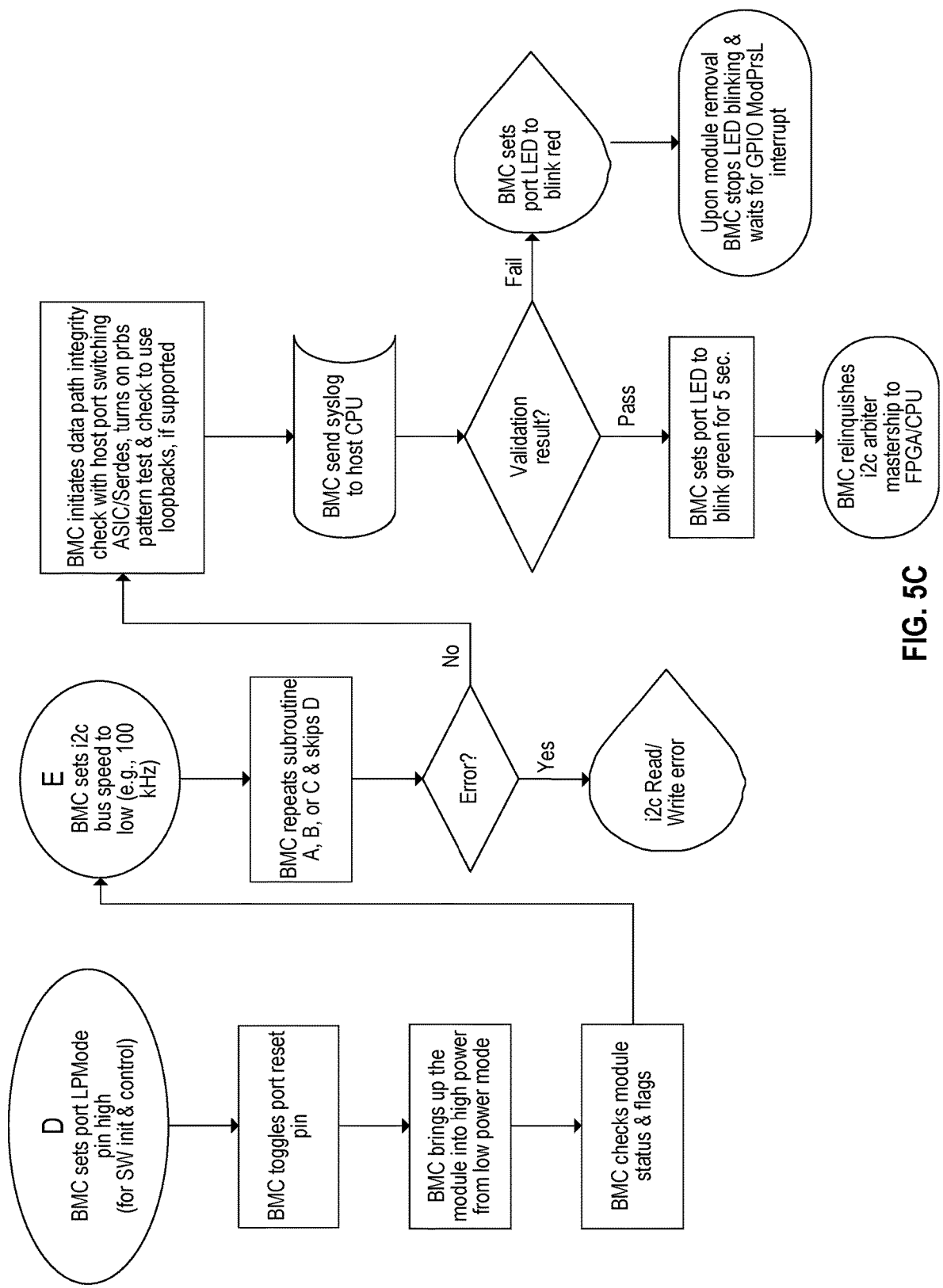

FIG. 5A-FIG. 5C are more elaborate depictions of an exemplary process for validating transceivers, according to embodiments of the present disclosure. As depicted, process 500 may comprise various branches (labeled A through E in FIG. 5A through FIG. 5C) that may depend on, e.g., the type of module that is detected on a TVP or the type of electro-optical modulation scheme employed. In one or more embodiments, process 500 may comprise testing the availability and status of features of various hardware or software architectures and components. For example, a testing routine may test for the presence of a digital signal processing device that can process four-level pulse amplitude modulation signal, or a clock data recovery device and whether it allows changing module speeds, e.g., from 25 Gb/s per lane to 10 Gb/s per lane, or whether a certain module has a reset pin, and the like.

In one or more embodiments, testing routines performed at one or more suitable bus speeds may comprise enabling and disabling lasers, power modes, software resets, and checking for related functionality tests and alarms or status flags. Testing routines may be used to activate and test data paths, e.g., to control the data plane at the module level. As indicated in path E in FIG. 5C, this may be accomplished by applying a known test pattern to a data path between a host and the transceiver.

It is understood that various paths may be independently activated and that testing routines may be customized, e.g., to read different formats, match the characteristics of any number of modules, and so on. In one or more embodiments, testing routines may be internal and comprise internal paths, e.g., path D, which in the example FIG. 5C is independent of I2C bus speeds.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 6:
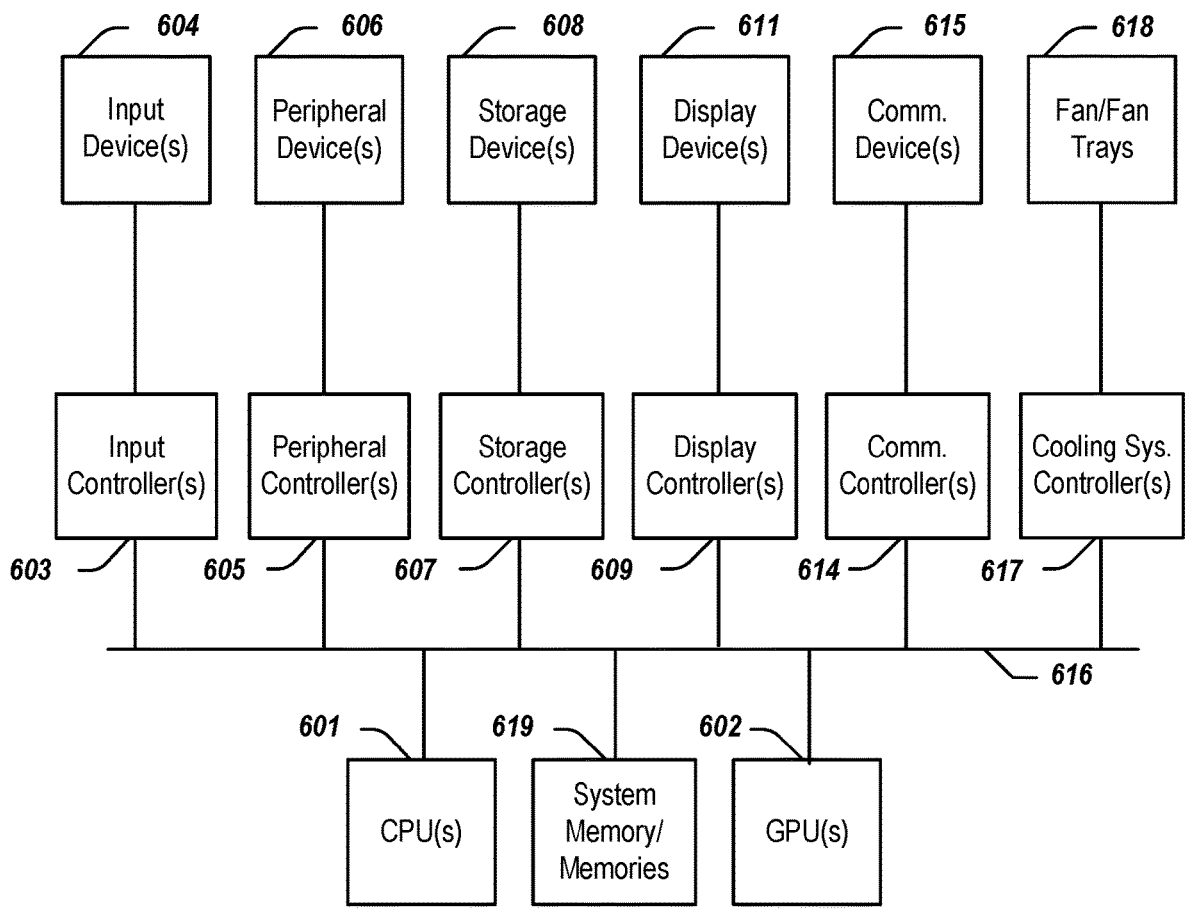
FIG. 6 depicts a simplified block diagram of an information handling system, according to embodiments of the present disclosure.

FIG. 6 depicts a simplified block diagram of an information handling system (or computing system), according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more CPUs 601 that provides computing resources and controls the computer. CPU 601 may be implemented with a microprocessor or the like and may also include one or more graphics processing units (GPU) 602 and/or a floating-point coprocessor for mathematical computations. In one or more embodiments, one or more GPUs 602 may be incorporated within the display controller 609, such as part of a graphics card or cards. The system 600 may also include a system memory 619, which may comprise RAM, ROM, or both.

A number of controllers and peripheral devices may also be provided, as shown in FIG. 6. An input controller 603 represents an interface to various input device(s) 604, such as a keyboard, mouse, touchscreen, stylus, microphone, camera, trackpad, display, etc. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT) display, a thin film transistor (TFT) display, organic light-emitting diode, electroluminescent panel, plasma panel, or any other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 600 comprises one or more fans or fan trays 618 and a cooling subsystem controller or controllers 617 that monitors thermal temperature(s) of the system 600 (or components thereof) and operates the fans/fan trays 618 to help regulate the temperature.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 7:
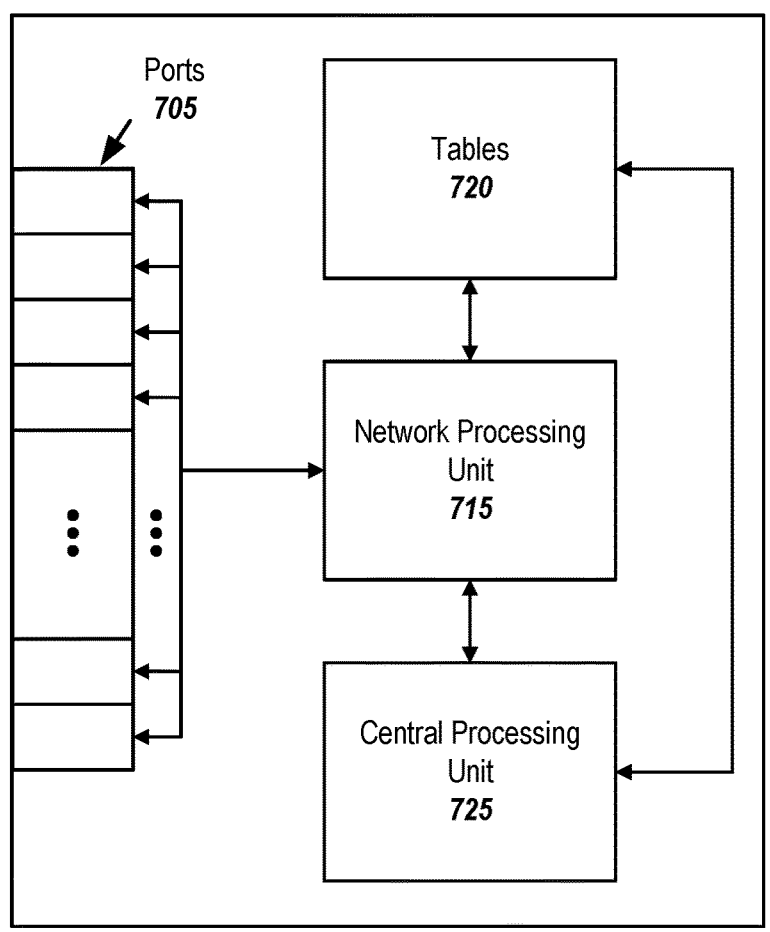
FIG. 7 depicts an alternative block diagram of an information handling system, according to embodiments of the present disclosure.

FIG. 7 depicts an alternative block diagram of an information handling system, according to embodiments of the present disclosure. It will be understood that the functionalities shown for system 700 may operate to support various embodiments of the present disclosure—although it shall be understood that such system may be differently configured and include different components, additional components, or fewer components.

The information handling system 700 may include a plurality of I/O ports 705, a network processing unit (NPU) 715, one or more tables 720, and a CPU 725. The system includes a power supply (not shown) and may also include other components, which are not shown for sake of simplicity.

In one or more embodiments, the I/O ports 705 may be connected via one or more cables to one or more other network devices or clients. The network processing unit 715 may use information included in the network data received at the node 700, as well as information stored in the tables 720, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. A method for validating a transceiver at a test port, the method comprising:
    in response to a transceiver being detected as having been inserted into or connected to a physical test port of an information handling system, which comprises a set of ports, using a first controller to perform a validation of the transceiver;
    in response to the validation of the transceiver being successful, authorizing use of the transceiver to communicate data via one or more of the ports of the set of ports of the information handling system; and
    in response to the validation of the transceiver not being successful, restricting the set of ports of the information handling system from operating using the transceiver, thereby, protecting the information handling system from a non-validated transceiver triggering at least one of a recovery procedure, an error, or a reboot procedure.

2. The method according to claim 1, wherein the first controller is a baseboard management controller (BMC) that obtains configuration information from the transceiver, the validation comprising performing steps comprising determining one or more features of at least one hardware or software component of the transceiver to determine that the transceiver is compatible with the information handling system.

3. The method according to claim 1, wherein authorizing use of the transceiver comprises granting access to an Inter-Integrated Circuit (I2C) communication channel between a second controller and the physical test port.

4. The method according to claim 3, wherein restricting the second controller comprises using a transceiver validation arbiter that is coupled, via the I2C communication channel, between the second controller and the physical test port to facilitate operation in a dedicated control plane.

5. The method according to claim 4, wherein the transceiver validation arbiter comprises a first interface that is accessible from the first controller and a second interface that is accessible from the second controller.

6. The method according to claim 5, wherein the first controller performs the validation by using a diagnostic tool that upon the validation being successful changes ownership of the I2C communication channel by making the second interface a primary port.

7. The method according to claim 6, wherein the transceiver validation arbiter uses a control signal to communicate to the second controller that the physical test port is accessible via the second interface.

8. The method according to claim 1, wherein restricting the set of ports of the information handling system comprises restricting a second controller from accessing the transceiver via a multiplexer tree.

9. A method for using a validation port, the method comprising:

in response to a transceiver being detected as having been inserted into or connected to at a physical validation port of an information handling system, which comprises a set of ports, using a first controller to perform a validation of the transceiver;

in response to the validation being successful, granting access to the transceiver to operate in data handling by the information handling system; and in response to the validation being unsuccessful, restricting use of the transceiver.

10. The method according to claim 9, wherein restricting use of comprises restricting a second controller from accessing the transceiver via a multiplexer tree to prevent the transceiver from affecting at least one of the second controller or one or more of the set of ports.

11. The method according to claim 9, wherein the first controller is a baseboard management controller (BMC) that retrieves configuration information from the transceiver to perform the validation.

12. The method according to claim 10, wherein restricting the second controller comprises using a transceiver validation arbiter that is coupled, via an Inter-Integrated Circuit (I2C) communication channel, between the first controller and the physical validation port to facilitate operation in a dedicated control plane.

13. The method according to claim 9, wherein at least one of the set of ports comprises a visual indicator that identifies the physical validation port as being a designated test port.

14. A transceiver validation port (TVP) arbiter comprising:

a first interface that communicatively couples the TVP arbiter via an communication channel to a physical port of an information handling system comprising a set of ports;

a second interface that is accessible from a host;

a third interface that is accessible from a baseboard management controller (BMC) that, in response to receiving a signal indicating that transceiver has been detected at the physical port, obtains ownership of the communication channel and performs a validation; and a circuit that in response to the transceiver passing the validation, uses the second interface to grant the host access to the transceiver to use the physical port to communicate with the transceiver in a data plane, the circuit, in response to the transceiver not passing the validation, restricts the host from accessing the transceiver.

15. The TVP arbiter according to claim 14, wherein the circuit grants the host access in response to the BMC relinquishing ownership of the communication channel to the host.

16. The TVP arbiter according to claim 14, wherein the second interface is coupled to a set of multiplexers via an controller, each multiplexer being coupled to a subset of the set of ports.

17. The TVP arbiter according to claim 14 wherein the BMC performing the validation comprises obtaining configuration information from the transceiver.

18. The TVP arbiter according to claim 17, wherein the BMC comprises logic that uses the configuration information to validate the transceiver.

19. The TVP arbiter according to claim 14, wherein the BMC performing the validation comprises determining one or more features of at least one component of the transceiver to determine that the transceiver is compatible with the information handling system.

20. The TVP arbiter according to claim 14, wherein in response to the transceiver being removed from the physical port, the BMC obtains ownership over the physical port.

* * * * *